United States Patent
Wang et al.

(10) Patent No.: US 10,601,801 B2
(45) Date of Patent: Mar. 24, 2020

(54) IDENTITY AUTHENTICATION METHOD AND APPARATUS

(71) Applicant: HUAWEI TECHNOLOGIES CO., LTD., Shenzhen, Guangdong (CN)

(72) Inventors: Jiangsheng Wang, Shenzhen (CN); Qingchun Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 15/639,273

(22) Filed: Jun. 30, 2017

(65) Prior Publication Data

US 2017/0302646 A1   Oct. 19, 2017

Related U.S. Application Data

(63) Continuation of application No. PCT/CN2015/088636, filed on Aug. 31, 2015.

(30) Foreign Application Priority Data

Jan. 4, 2015 (CN) .......................... 2015 1 0003808

(51) Int. Cl.
*H04L 29/06* (2006.01)
*G06F 9/455* (2018.01)
*H04L 9/32* (2006.01)

(52) U.S. Cl.
CPC .......... *H04L 63/08* (2013.01); *G06F 9/45558* (2013.01); *H04L 9/3226* (2013.01);
(Continued)

(58) Field of Classification Search
CPC ... H04L 63/08; H04L 63/0442; H04L 63/061; H04L 63/0869; H04L 9/3226;
(Continued)

(56) References Cited

U.S. PATENT DOCUMENTS

2002/0169987 A1* 11/2002 Meushaw .......... G06F 21/6236
726/4
2003/0117985 A1   6/2003 Fujii et al.
(Continued)

FOREIGN PATENT DOCUMENTS

CN   101155030 A   4/2008
CN   101159556 A   4/2008
(Continued)

OTHER PUBLICATIONS

International Search Report, dated Oct. 27, 2015, in International Application No. PCT/CN2015/088636 (4 pp.)
(Continued)

*Primary Examiner* — Michael S McNally
(74) *Attorney, Agent, or Firm* — Fish & Richardson P.C.

(57) ABSTRACT

Embodiments of the present invention disclose an identity authentication method and apparatus. The NFV system includes a VNF including a first virtual network function component VNFC and a second VNFC. The method includes: generating a public key and a private key of the first VNFC and a public key and a private key of the second VNFC; writing or sending the private key of the first VNFC and the public key of the second VNFC to the first VNFC; and writing or sending the public key of the first VNFC and the private key of the second VNFC to the second VNFC, where the public key and the private key of the first VNFC and the public key and the private key of the second VNFC are used for identity authentication of the first VNFC and the second VNFC.

20 Claims, 8 Drawing Sheets

(52) U.S. Cl.
CPC .......... *H04L 29/06* (2013.01); *H04L 63/0442* (2013.01); *H04L 63/061* (2013.01); *H04L 63/0869* (2013.01); *G06F 2009/45587* (2013.01); *G06F 2009/45595* (2013.01)

(58) Field of Classification Search
CPC ................ H04L 29/06; G06F 9/45558; G06F 2009/45587; G06F 2009/45595
USPC ........................................................ 713/171
See application file for complete search history.

(56) References Cited

U.S. PATENT DOCUMENTS

| | | | | |
|---|---|---|---|---|
| 2003/0169714 | A1* | 9/2003 | Nakajima | H04L 63/08 370/338 |
| 2005/0283826 | A1* | 12/2005 | Tahan | G06F 21/575 726/2 |
| 2014/0208111 | A1 | 7/2014 | Brandwine et al. | |
| 2016/0127333 | A1† | 5/2016 | Sood et al. | |
| 2016/0149890 | A1* | 5/2016 | Ujiie | H04L 9/3268 726/3 |
| 2017/0054565 | A1† | 2/2017 | Feng et al. | |

FOREIGN PATENT DOCUMENTS

| | | |
|---|---|---|
| CN | 103888251 A | 6/2014 |
| CN | 104134122 A | 11/2014 |
| CN | 104580208 A | 4/2015 |
| WO | 2012/050419 A1 | 4/2012 |

OTHER PUBLICATIONS

ETSI: "Network Functions Virtualisation (NFV); Architectural Framework," ETSI GS NFV 002 V1.1.1, Oct. 1, 2013, XP55234536.

Extended European Search Report dated Nov. 16, 2017 in corresponding European Patent Application No. 15874889.7.

International Search Report dated Oct. 27, 2015 in corresponding International Patent Application No. PCT/CN2015/088636.

Chinese Office Action dated May 3, 2017 in corresponding Chinese Patent Application No. 201510003808.X.

\* cited by examiner
† cited by third party

IDENTITY AUTHENTICATION METHOD AND APPARATUS

CROSS-REFERENCE TO RELATED APPLICATIONS

This application is a continuation of International Application No. PCT/CN2015/088636, filed on Aug. 31, 2015, which claims priority to Chinese Patent Application No. 201510003808.X, filed on Jan. 4, 2015, The disclosures of the aforementioned applications are hereby incorporated by reference in their entireties.

TECHNICAL FIELD

The present invention relates to the field of communications technologies, and in particular, to an identity authentication method and apparatus applied to a Network Function Virtualization (NFV) system.

BACKGROUND

A Virtual Network Function (VNF) is the core part of an NFV system. Each VNF includes a plurality of VNF components (VNFC), and the VNFCs communicate with each other through an internal virtual network. Because the VNFCs in the VNF communicate through a virtual network, identity authentication needs to be performed when communication is initially established between two VNFCs, so as to prevent security risks such as information leakage, impersonation during communication, and tampering of communication content.

In the prior art, usually a trusted identity credential is manually configured on each VNFC, and when communication is initially established between two VNFCs, identity authentication is performed based on the trusted identity credentials that are configured manually. However, because a VNF in an NFV system changes dynamically, the solution of manually configuring trusted identity credentials is inefficient and cannot adapt to the dynamically changing VNF.

SUMMARY

Embodiments of the present invention provide an identity authentication method and apparatus, so as to adapt to a dynamically changing VNF.

According to a first aspect, an identity authentication method is provided, which is applied to a network function virtualization (NFV) system, where the NFV system includes a virtual network function (VNF), and the VNF includes a first virtual network function component (VNFC) and a second VNFC. The method includes:

generating a public key and a private key of the first VNFC and a public key and a private key of the second VNFC;

writing or sending the private key of the first VNFC and the public key of the second VNFC to the first VNFC; and writing or sending the public key of the first VNFC and the private key of the second VNFC to the second VNFC, where the public key and the private key of the first VNFC and the public key and the private key of the second VNFC are used for identity authentication of the first VNFC and the second VNFC.

With reference to the first aspect, in a first possible implementation manner, the writing or sending the private key of the first VNFC and the public key of the second VNFC to the first VNFC includes:

writing the private key of the first VNFC and the public key of the second VNFC to the first VNFC when the first VNFC is generated; or sending the private key of the first VNFC and the public key of the second VNFC to the first VNFC by using a management communication channel of the first VNFC when the first VNFC is a management VNFC.

With reference to the first aspect or the first possible implementation manner of the first aspect, in a second possible implementation manner, writing or sending identification information of the second VNFC to the first VNFC, where a correspondence between the identification information of the second VNFC and the public key of the second VNFC is stored in the first VNFC.

With reference to the first aspect, the first possible implementation manner of the first aspect, or the second possible implementation manner of the first aspect, in a third possible implementation manner, the method further includes: writing or sending identification information of the first VNFC to the first VNFC.

According to a second aspect, an identity authentication method is provided, which is applied to a network function virtualization (NFV) system, where the NFV system includes a virtual network function (VNF), and the VNF includes a first virtual network function component (VNFC) and a second VNFC. The method includes:

generating a dedicated key of the first VNFC and a dedicated key of the second VNFC;

writing or sending the dedicated key of the first VNFC and the dedicated key of the second VNFC to the first VNFC; and writing or sending the dedicated key of the first VNFC and the dedicated key of the second VNFC to the second VNFC, where the dedicated key of the first VNFC and the dedicated key of the second VNFC are used for identity authentication of the first VNFC and the second VNFC;

With reference to the second aspect, in a first possible implementation manner, the writing or sending the dedicated key of the first VNFC and the dedicated key of the second VNFC to the first VNFC includes:

writing the dedicated key of the first VNFC and the dedicated key of the second VNFC to the first VNFC when the first VNFC is generated; or sending the dedicated key of the first VNFC and the dedicated key of the second VNFC to the first VNFC by using a management communication channel of the first VNFC when the first VNFC is a management VNFC.

With reference to the second aspect or the first possible implementation manner of the second aspect, in a second possible implementation manner, the method further includes:

writing or sending identification information of the second VNFC to the first VNFC, where a correspondence between the identification information of the second VNFC and the dedicated key of the second VNFC is stored in the first VNFC.

With reference to the second aspect, the first possible implementation manner of the second aspect, or the second possible implementation manner of the second aspect, in a third possible implementation manner, the method further includes:

writing or sending identification information of the first VNFC to the first VNFC.

According to a third aspect, an identity authentication apparatus is provided, which is applied to a network function virtualization (NFV) system, where the NFV system includes a virtual network function (VNF), and the VNF includes a first virtual network function component (VNFC) and a second VNFC. The apparatus includes:

a processor, configured to generate a public key and a private key of the first VNFC and a public key and a private key of the second VNFC; and an input/output interface, configured to write or send the private key of the first VNFC and the public key of the second VNFC to the first VNFC, and write or send the public key of the first VNFC and the private key of the second VNFC to the second VNFC, where the public key and the private key of the first VNFC and the public key and the private key of the second VNFC are used for identity authentication of the first VNFC and the second VNFC.

With reference to the third aspect, in a first possible implementation manner, the input/output interface is specifically configured to: write the private key of the first VNFC and the public key of the second VNFC to the first VNFC when the first VNFC is generated; or send the private key of the first VNFC and the public key of the second VNFC to the first VNFC by using a management communication channel of the first VNFC when the first VNFC is a management VNFC.

With reference to the third aspect or the first possible implementation manner of the third aspect, in a second possible implementation manner, the input/output interface is further configured to write or send identification information of the second VNFC to the first VNFC, where a correspondence between the identification information of the second VNFC and the public key of the second VNFC is stored in the first VNFC.

With reference to the third aspect, the first possible implementation manner of the third aspect, or the second possible implementation manner of the third aspect, in a third possible implementation manner, the input/output interface is further configured to write or send identification information of the first VNFC to the first VNFC.

With reference to the third aspect, the first possible implementation manner of the third aspect, the second possible implementation manner of the third aspect, or the third possible implementation manner of the third aspect, in a fourth possible implementation manner, the input/output interface includes a writer or a sender.

According to a fourth aspect, an identity authentication apparatus is provided, which is applied to a network function virtualization (NFV) system, where the NFV system includes a virtual network function (VNF), and the VNF includes a first virtual network function component (VNFC) and a second VNFC. The apparatus includes:

a processor, configured to generate a dedicated key of the first VNFC and a dedicated key of the second VNFC; and an input/output interface, configured to write or send the dedicated key of the first VNFC and the dedicated key of the second VNFC to the first VNFC, and write or send the dedicated key of the first VNFC and the dedicated key of the second VNFC to the second VNFC, where the dedicated key of the first VNFC and the dedicated key of the second VNFC are used for identity authentication of the first VNFC and the second VNFC.

With reference to the fourth aspect, in a first possible implementation manner, the input/output interface is specifically configured to: write the dedicated key of the first VNFC and the dedicated key of the second VNFC to the first VNFC when the first VNFC is generated; or send the dedicated key of the first VNFC and the dedicated key of the second VNFC to the first VNFC by using a management communication channel of the first VNFC when the first VNFC is a management VNFC.

With reference to the fourth aspect or the first possible implementation manner of the fourth aspect, in a second possible implementation manner, the input/output interface is further configured to write or send identification information of the second VNFC to the first VNFC, where a correspondence between the identification information of the second VNFC and a dedicated key of the second VNFC is stored in the first VNFC.

With reference to the fourth aspect, the first possible implementation manner of the fourth aspect, or the second possible implementation manner of the fourth aspect, in a third possible implementation manner, the input/output interface is further configured to write or send identification information of the first VNFC to the first VNFC.

With reference to the fourth aspect, the first possible implementation manner of the fourth aspect, the second possible implementation manner of the fourth aspect, or the third possible implementation manner of the fourth aspect, in a fourth possible implementation manner, the input/output interface includes a writer or a sender.

According to the identity authentication method provided by the first aspect, the identity authentication method provided by the second aspect, the identity authentication apparatus provided by the third aspect, and the identity authentication apparatus provided by the fourth aspect, identity credentials are automatically placed into a first VNFC and a second VNFC, and identity authentication between the first VNFC and the second VNFC can be implemented based on the placed identity credentials. Compared with the prior art, the present invention has higher efficiency and can adapt to a dynamically changing VNF.

BRIEF DESCRIPTION OF DRAWINGS

The drawings are provided to further understand the present invention, and they constitute a part of the application. The drawings, along with the embodiments of the present invention, are used to explain the present invention, and pose no limitation on the present invention. In the drawings.

DESCRIPTION OF EMBODIMENTS

To provide an identity authentication solution that can adapt to a dynamically changing VNF, embodiments of the present invention provide an identity authentication method and apparatus. Embodiments of the present invention are described below with reference to the accompanying drawings of the specification. It should be understood that the preferred embodiments described herein are only used for describing and explaining the present invention, but are not intended to limit the present invention. In addition, the embodiments in this application and features in the embodiments may be combined with other as long as they do not conflict.

Figure 1:
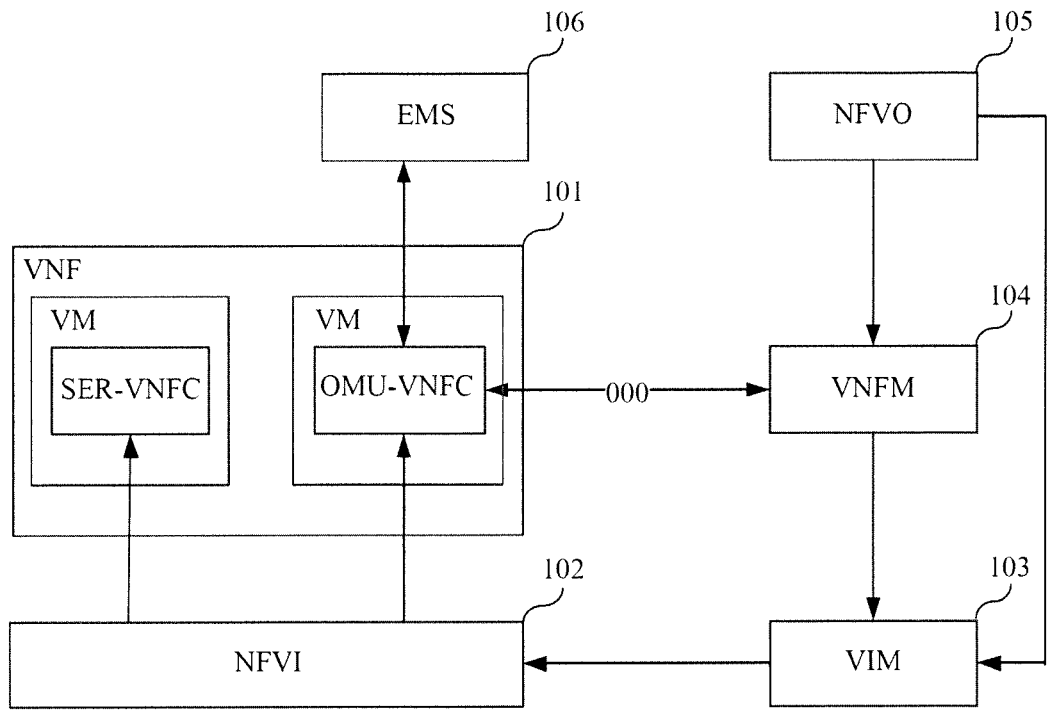
FIG. 1 is a schematic diagram of an architecture of an NFV system.

FIG. 1 shows an architecture of an NFV system, mainly including:

a VNF 101, including a plurality of VNFCs, where each VNFC runs on a virtual machine (VM); in the plurality of VNFCs, one VNFC serves as a management VNFC (OMU-VNFC), and other VNFCs may all be considered as service VNFCs (SER-VNFC); and the OMU-VNFC centrally manages the SER-VNFCs, and communicates with other parts of the NFV system by using a management communication channel 000;

a network function virtual infrastructure (NFVI) 102, including virtual resources such as virtual computing resources, virtual storage resources, and virtual network resources;

a virtual infrastructure manager (VIM) 103, configured to manage the NFVI, and capable of creating a virtual resource, a VNF, and a network connection required by a VNF;

a VNF manager (VNFM) 104, configured to manage a life cycle of a VNF, for example, establish, modify, or destruct a VNF, where some management operations on the life cycle, such as establishment of a VNF, need to be implemented by using the VIM;

an NFV orchestra (NFVO) 105, configured to manage a VNF by using the VNFM, and implement networking of a plurality of VNFs by using the VIM; and an element management system (EMS) 106, configured to manage a VNF as a network element, and mainly related to management services.

In the embodiments of the present invention, a VNF includes at least a first VNFC and a second VNFC. The following uses identity authentication between the first VNFC and the second VNFC as an example to describe in detail an identity authentication method provided by the embodiments of the present invention with reference to specific embodiments. In the following specific embodiments, the first VNFC is specifically an OMU-VNFC, and the second VNFC is specifically a SER-VNFC.

Embodiment 1

Figure 2:
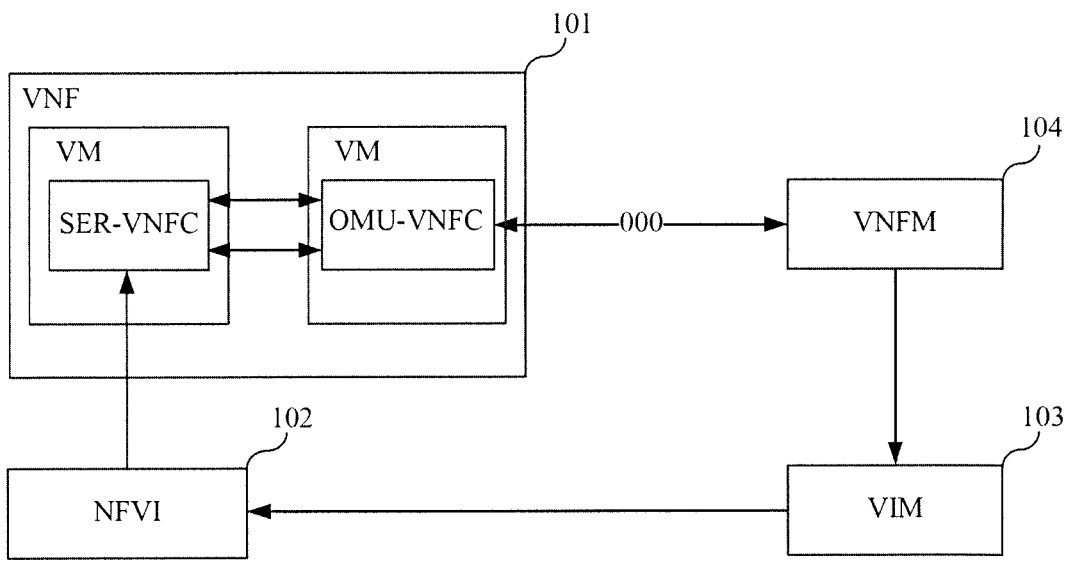
FIG. 2 is a schematic diagram of an identity authentication solution according to Embodiment 1 of the present invention.

In Embodiment 1 of the present invention, establishment of a VNF is initiated by the VNFM. As shown in FIG. 2, the VNFM generates all configuration information required for establishing the VNF. The configuration information includes a public key and a private key of an OMU-VNFC and a public key and a private key of a SER-VNFC.

The public key and the private key are a key pair obtained by using an algorithm. In the two keys of the key pair, the non-secret key is referred to as the public key, and the secret key is referred to as the private key. When the key pair is used, if data is encrypted by using the public key, the data needs to be decrypted by using the private key, or if data is encrypted by using the private key, the data needs to be decrypted by using the public key. Otherwise, the decryption fails.

The VNFM places identification information and the private key of the OMU-VNFC and identification information and the public key of the SER-VNFC into the OMU-VNFC, and places the identification information and the public key of the OMU-VNFC and the identification information and the private key of the SER-VNFC into the SER-VNFC.

Specifically, the VNFM may deliver, to the VIM, all the generated configuration information required for establishing the VNF, instruct the VIM to write the identification information and the private key of the OMU-VNFC and the identification information and the public key of the SER-VNFC to the OMU-VNFC when performing generation of the OMU-VNFC, and instruct the VIM to write the identification information and the public key of the OMU-VNFC and the identification information and the private key of the SER-VNFC to the SER-VNFC when performing generation of the SER-VNFC. The VIM cooperates with the NFVI to implement the generation of the OMU-VNFC and the generation of the SER-VNFC.

It should be understood by persons skilled in the art that "write" may also be referred to as "inject".

For the OMU-VNFC, if a management communication channel 000 between the VNFM and the OMU-VNFC is already established, the VNFM may send the identification information and the private key of the OMU-VNFC and the identification information and the public key of the SER-VNFC to the OMU-VNFC by using the management communication channel 000, so as to implement placement.

Figure 7:
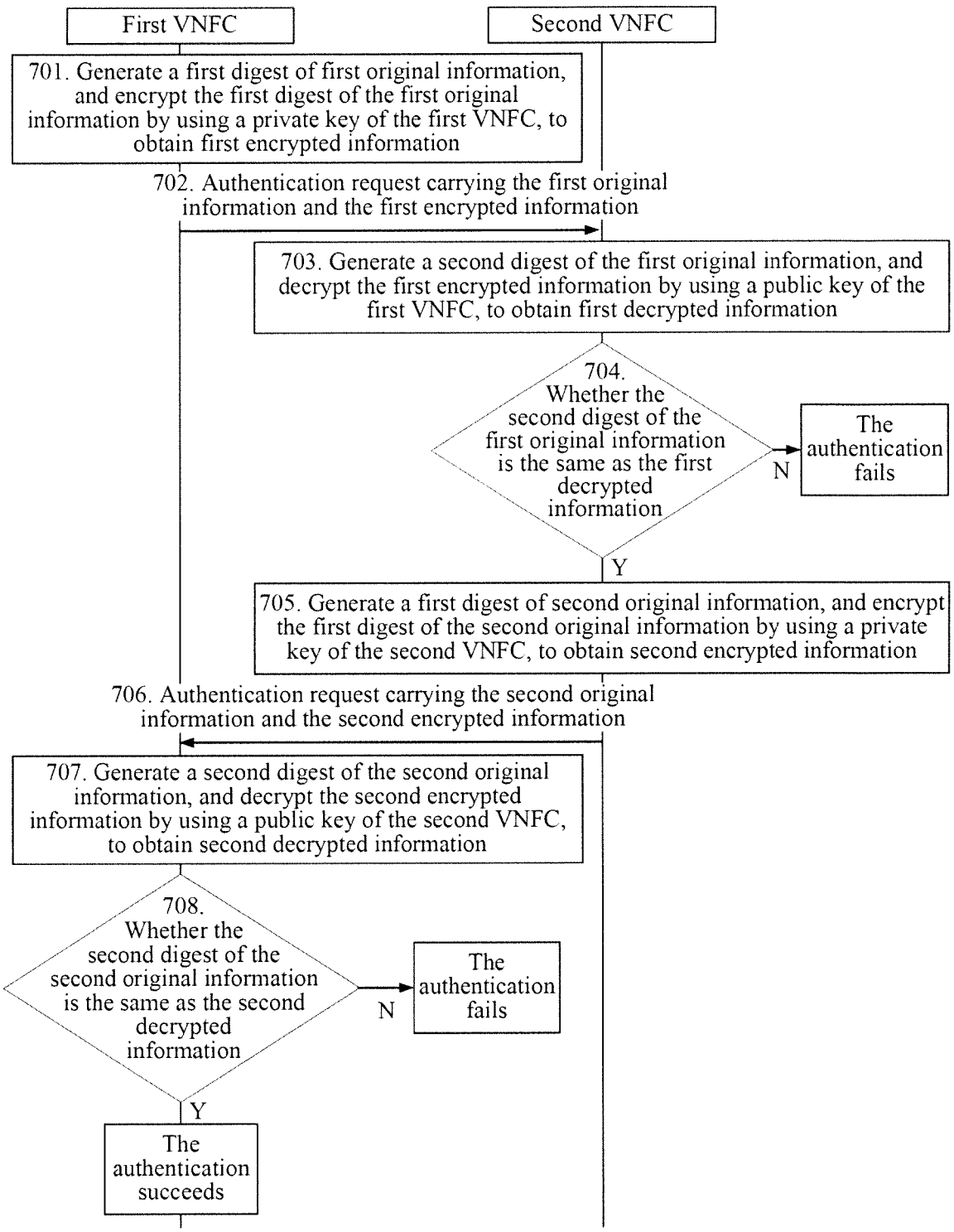
FIG. 7 is a first schematic diagram of an identity authentication process according to an embodiment of the present invention.

Subsequently, the OMU-VNFC and the SER-VNFC may perform identity authentication based on the placed public keys and private keys. For a specific authentication manner, refer to the following detailed description of FIG. 7.

That is, in Embodiment 1, the identity authentication method provided by the embodiments of the present invention is performed by the VNFM.

Embodiment 2

Figure 3:
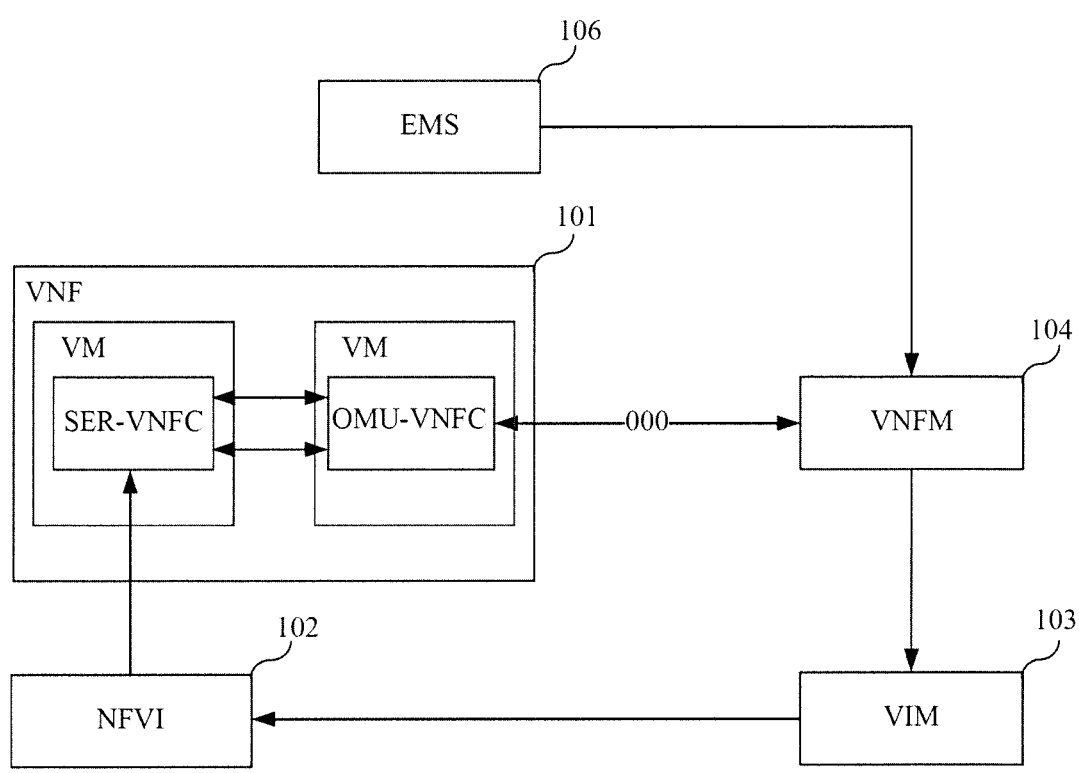
FIG. 3 is a schematic diagram of an identity authentication solution according to Embodiment 2 of the present invention.

In Embodiment 2 of the present invention, establishment of a VNF is initiated by the EMS, as shown in FIG. 3.

When the establishment of the VNF is initiated by the EMS, the EMS may not participate in generation of private keys and public keys, and a public key and a private key of an OMU-VNFC and a public key and a private key of a SER-VNFC are still generated by the VNFM. For subsequent placement steps, refer to the foregoing Embodiment 1. In this case, the identity authentication method provided by the embodiments of the present invention is performed by the VNFM Alternatively, the EMS may participate in the generation of the public keys and the private keys, that is, the EMS generates the public key and the private key of the OMU-VNFC and the public key and the private key of the SER-VNFC. The EMS delivers the public key and the private key of the OMU-VNFC and the public key and the private key of the SER-VNFC that are generated to the VNFM, and instructs the VNFM to perform the placement of the public keys and the private keys. In this case, the identity authentication method provided by the embodiments of the present invention is performed by the EMS.

Embodiment 3

Figure 4:
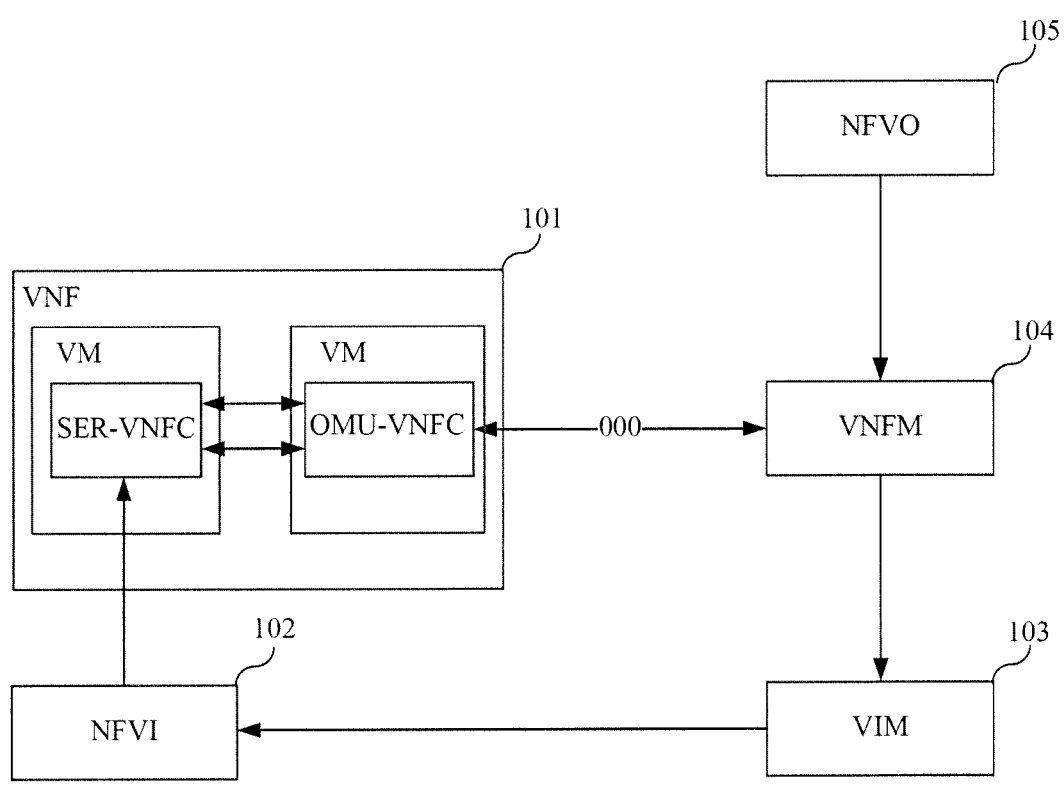
FIG. 4 is a schematic diagram of an identity authentication solution according to Embodiment 3 of the present invention.

In Embodiment 3 of the present invention, establishment of a VNF is initiated by the NFVO, as shown in FIG. 4. The NFVO may not participate in generation of public keys and private keys, and a public key and a private key of an OMU-VNFC and a public key and a private key of the SER-VNFC are still generated by the VNFM. For subsequent placement steps, refer to the foregoing Embodiment 1.

That is, in Embodiment 3, the identity authentication method provided by the embodiments of the present invention is performed by the VNFM.

Embodiment 4

Figure 5:
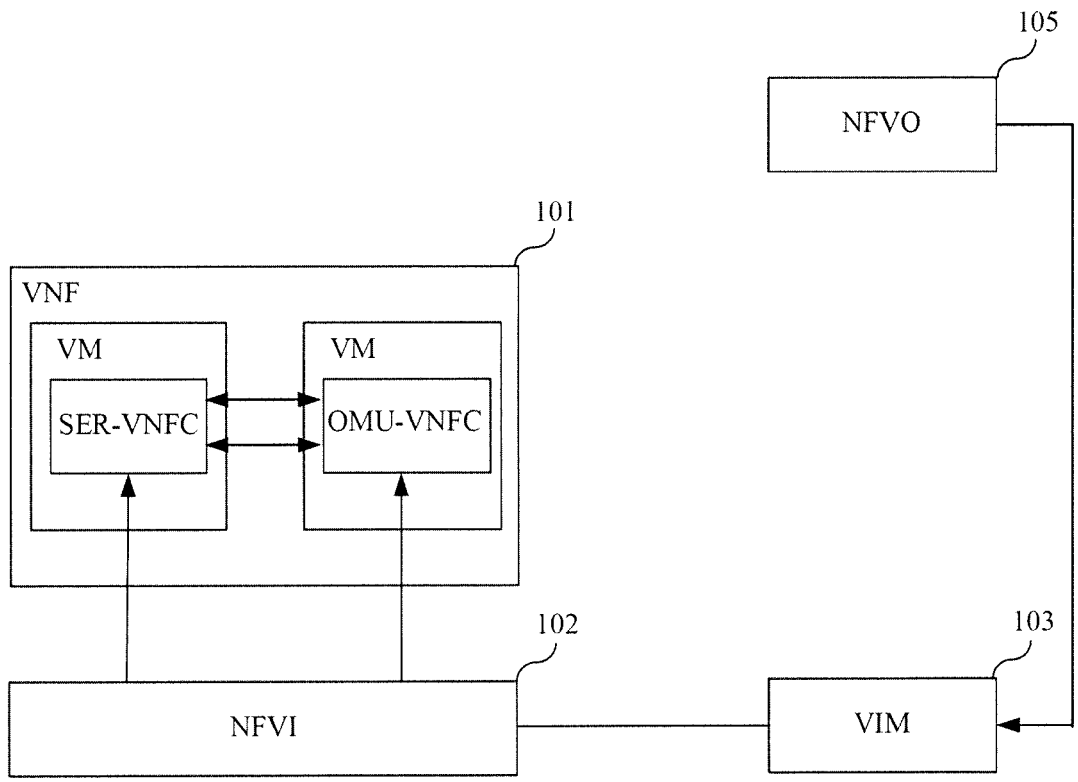
FIG. 5 is a schematic diagram of an identity authentication solution according to Embodiment 4 of the present invention.

In Embodiment 4 of the present invention, establishment of a VNF is also initiated by the NFVO, as shown in FIG. 5. The NFVO generates all configuration information required for establishing the VNF. The configuration information includes a public key and a private key of an OMU-VNFC and a public key and a private key of a SER-VNFC in the VNF.

The NFVO places identification information and the private key of the OMU-VNFC and identification information and the public key of the SER-VNFC into the OMU-VNFC, and places the identification information and the public key of the OMU-VNFC and the identification information and the private key of the SER-VNFC into the SER-VNFC.

Specifically, the NFVO delivers, to the VIM, all the generated configuration information required for establishing the VNF, instructs the VIM to write the identification information and the private key of the OMU-VNFC and the identification information and the public key of the SER-VNFC to the OMU-VNFC when performing generation of the OMU-VNFC, and instructs the VIM to write the identification information and the public key of the OMU-VNFC and the identification information and the private key of the SER-VNFC to the OMU-VNFC when performing generation of the SER-VNFC. The VIM cooperates with the NFVI to implement the generation of the OMU-VNFC and the generation of the SER-VNFC.

Subsequently, the OMU-VNFC and the SER-VNFC may perform identity authentication based on the written public keys and private keys. For a specific authentication manner, refer to the following detailed description of FIG. 7.

That is, in Embodiment 4, the identity authentication method provided by the embodiments of the present invention is performed by the NFVO.

Figure 6:
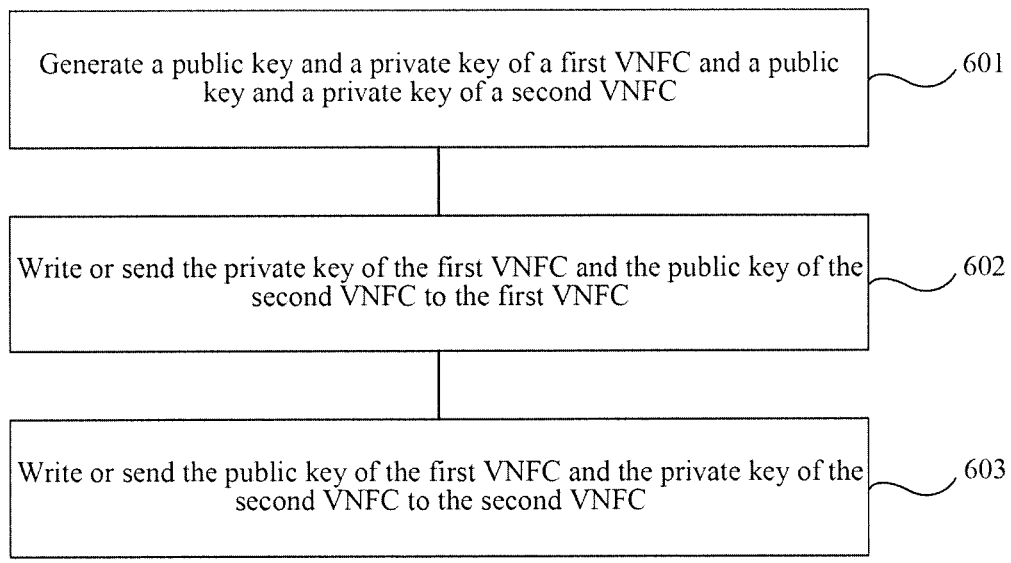
FIG. 6 is a first schematic diagram of an identity authentication method according to an embodiment of the present invention.

Based on the above, an embodiment of the present invention provides an identity authentication method, applied to an NFV system. The NFV system includes a VNF, and the VNF includes a first VNFC and a second VNFC. As shown in FIG. 6, the identity authentication method may specifically include the following steps.

Step 601. Generate a public key and a private key of the first VNFC and a public key and a private key of the second VNFC.

Step 602. Write or send the private key of the first VNFC and the public key of the second VNFC to the first VNFC.

Step 603. Write or send the public key of the first VNFC and the private key of the second VNFC to the second VNFC, where the public key and the private key of the first VNFC and the public key and the private key of the second VNFC are used for identity authentication of the first VNFC and the second VNFC.

It should be noted that, the foregoing step 602 and step 603 are not necessarily performed in a particular order.

In a specific embodiment, the private key of the first VNFC and the public key of the second VNFC may be written to the first VNFC when the first VNFC is generated. In another specific embodiment, when the first VNFC is an OMU-VNFC, if a management communication channel of the first VNFC is already established, the private key of the first VNFC and the public key of the second VNFC may be sent to the first VNFC by using the management communication channel of the first VNFC.

Correspondingly, in a specific embodiment, the public key of the first VNFC and the private key of the second VNFC may be written to the second VNFC when the second VNFC is generated. In another specific embodiment, when the second VNFC is an OMU-VNFC, if a management communication channel of the second VNFC is already established, the public key of the first VNFC and the private key of the second VNFC may be sent to the second VNFC by using the management communication channel of the second VNFC.

That is, in this embodiment of the present invention, the private key of the first VNFC and the public key of the second VNFC are placed into the first VNFC, and the public key of the first VNFC and the private key of the second VNFC are placed into the second VNFC. The first VNFC and the second VNFC may perform identity authentication according to the placed public keys and private keys based on an asymmetric encryption algorithm. A specific manner is not specifically limited in the present invention.

For example, in a specific embodiment, when the private key of the first VNFC and the public key of the second VNFC are written or sent to the first VNFC, identification information of the first VNFC may further be written or sent to the first VNFC; when the public key of the first VNFC and the private key of the second VNFC are written or sent to the second VNFC, identification information of the second VNFC may further be written or sent to the second VNFC. In this case, an identity authentication process shown in FIG. 7 may be used between the first VNFC and the second VNFC. The process specifically includes the following steps.

Step 701. The first VNFC generates a first digest of first original information, and encrypts the first digest of the first original information by using the private key of the first VNFC, to obtain first encrypted information. The first original information includes the identification information of the first VNFC, and may further include a communication connection request of the first VNFC to the second VNFC.

Step 702. The first VNFC sends an authentication request carrying the first original information and the first encrypted information to the second VNFC.

Step 703. The second VNFC receives the authentication request carrying the first original information and the first encrypted information and sent by the first VNFC; then, the second VNFC generates a second digest of the first original information, and decrypts the first encrypted information by using the public key of the first VNFC, to obtain first decrypted information.

Step 704. Determine whether the second digest of the first original information is the same as the first decrypted information.

When the second digest of the first original information is different from the first decrypted information, identity authentication of the first VNFC by the second VNFC fails, the authentication process ends, and a communication connection is not established between the two VNFCs.

When the second digest of the first original information is the same as the first decrypted information, the identity authentication of the first VNFC by the second VNFC succeeds, and perform step 705.

Step 705. The second VNFC generates a first digest of second original information, and encrypts the first digest of the second original information by using the private key of the second VNFC, to obtain second encrypted information. The second original information includes the identification information of the second VNFC, and may further include a communication connection request of the second VNFC to the first VNFC.

Step 706. The second VNFC sends an authentication request carrying the second original information and the second encrypted information to the first VNFC.

Step 707. The first VNFC receives the authentication request carrying the second original information and the second encrypted information and sent by the second VNFC; then, the first VNFC generates a second digest of the second original information, and decrypts the second encrypted information by using the public key of the second VNFC, to obtain second decrypted information.

Step 708. Determine whether the second digest of the second original information is the same as the second decrypted information.

When the second digest of the second original information is different from the second decrypted information, identity authentication of the second VNFC by the first VNFC fails, and a communication connection is not established between the two VNFCs.

When the second digest of the second original information is the same as the second decrypted information, the identity authentication of the second VNFC by the first VNFC succeeds. In this case, the identity authentication between the first VNFC and the second VNFC succeeds, and a secure communication connection can be established between the two VNFCs.

Preferably, when the private key of the first VNFC and the public key of the second VNFC are written or sent to the first VNFC, the identification information of the second VNFC may further be written or sent to the first VNFC. A correspondence between the identification information of the second VNFC and the public key of the second VNFC is stored in the first VNFC, so that subsequently when an authentication request sent by the second VNFC is received, the public key of the second VNFC can be obtained quickly according to the identification information of the second VNFC in the second original information.

Correspondingly, when the public key of the first VNFC and the private key of the second VNFC are written or sent to the second VNFC, the identification information of the first VNFC may further be written or sent to the second VNFC. A correspondence between the identification information of the first VNFC and the public key of the first VNFC is stored in the second VNFC, so that subsequently when an authentication request sent by the first VNFC is received, the public key of the first VNFC can be obtained quickly according to the identification information of the first VNFC in the first original information.

It can be seen that, by means of the foregoing identity authentication method provided by this embodiment of the present invention, when configuration information required for establishing a VNF is generated, a pair of public key and private key may be generated for each of VNFCs that constitute the VNF; the private key of the VNFC is placed into the VNFC, and the public key of the VNFC is placed into a VNFC that needs to communicate with the VNFC. Certainly, a quantity of VNFCs that need to communicate with the VNFC may be one or more. Identity authentication between the VNFCs can be implemented by verifying matching of the public keys and the private keys between the VNFCs.

Figure 8:
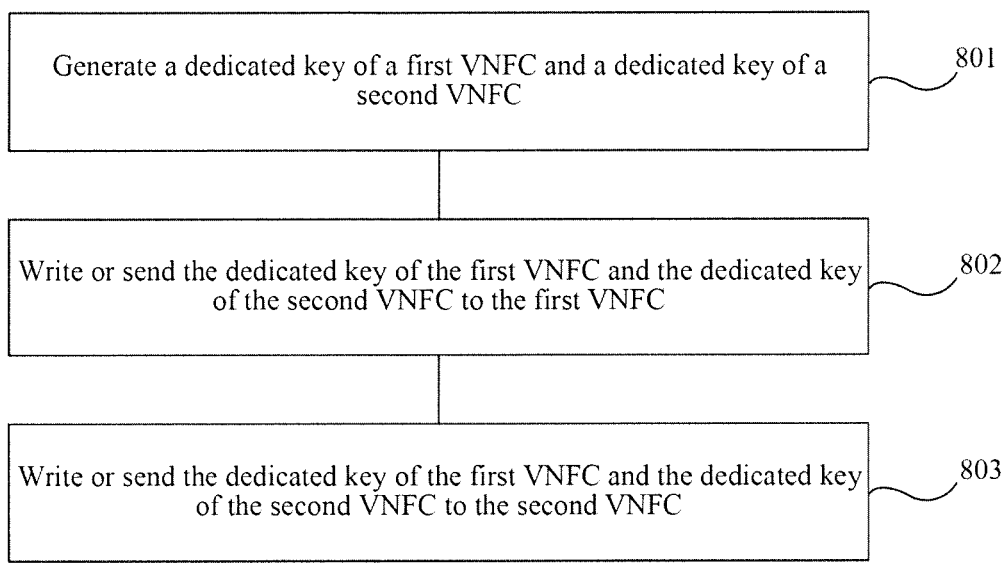
FIG. 8 is a second schematic diagram of an identity authentication method according to an embodiment of the present invention.

Based on the same invention concept, an embodiment of the present invention further provides an identity authentication method, applied to an NFV system. The NFV system includes a VNF, and the VNF includes a first VNFC and a second VNFC. As shown in FIG. 8, the identity authentication method may specifically include the following steps.

Step 801. Generate a dedicated key of the first VNFC and a dedicated key of the second VNFC.

The dedicated key may also be referred to as a symmetric key. If data is encrypted by using a dedicated key, the data needs to be decrypted by using the dedicated key; otherwise, the decryption fails.

Step 802. Write or send the dedicated key of the first VNFC and the dedicated key of the second VNFC to the first VNFC.

Step 803. Write or send the dedicated key of the first VNFC and the dedicated key of the second VNFC to the second VNFC, where the dedicated key of the first VNFC and the dedicated key of the second VNFC are used for identity authentication of the first VNFC and the second VNFC.

It should be noted that, the foregoing step 802 and step 803 are not necessarily performed in a particular order.

In a specific embodiment, the dedicated key of the first VNFC and the dedicated key of the second VNFC may be written to the first VNFC when the first VNFC is generated. In another specific embodiment, when the first VNFC is an OMU-VNFC, the dedicated key of the first VNFC and the dedicated key of the second VNFC may be sent to the first VNFC by using a management communication channel of the first VNFC.

Correspondingly, in a specific embodiment, the dedicated key of the first VNFC and the dedicated key of the second VNFC may be written to the second VNFC when the second VNFC is generated. In another specific embodiment, when the second VNFC is an OMU-VNFC, the dedicated key of the first VNFC and the dedicated key of the second VNFC may be sent to the second VNFC by using a management communication channel of the second VNFC.

That is, in this embodiment of the present invention, the dedicated key of the first VNFC and the dedicated key of the second. VNFC are placed into the first VNFC and the second VNFC. The first VNFC and the second VNFC may perform identity authentication according to the placed dedicated keys based on a symmetric encryption algorithm. A specific manner is not limited in the present invention.

Figure 9:
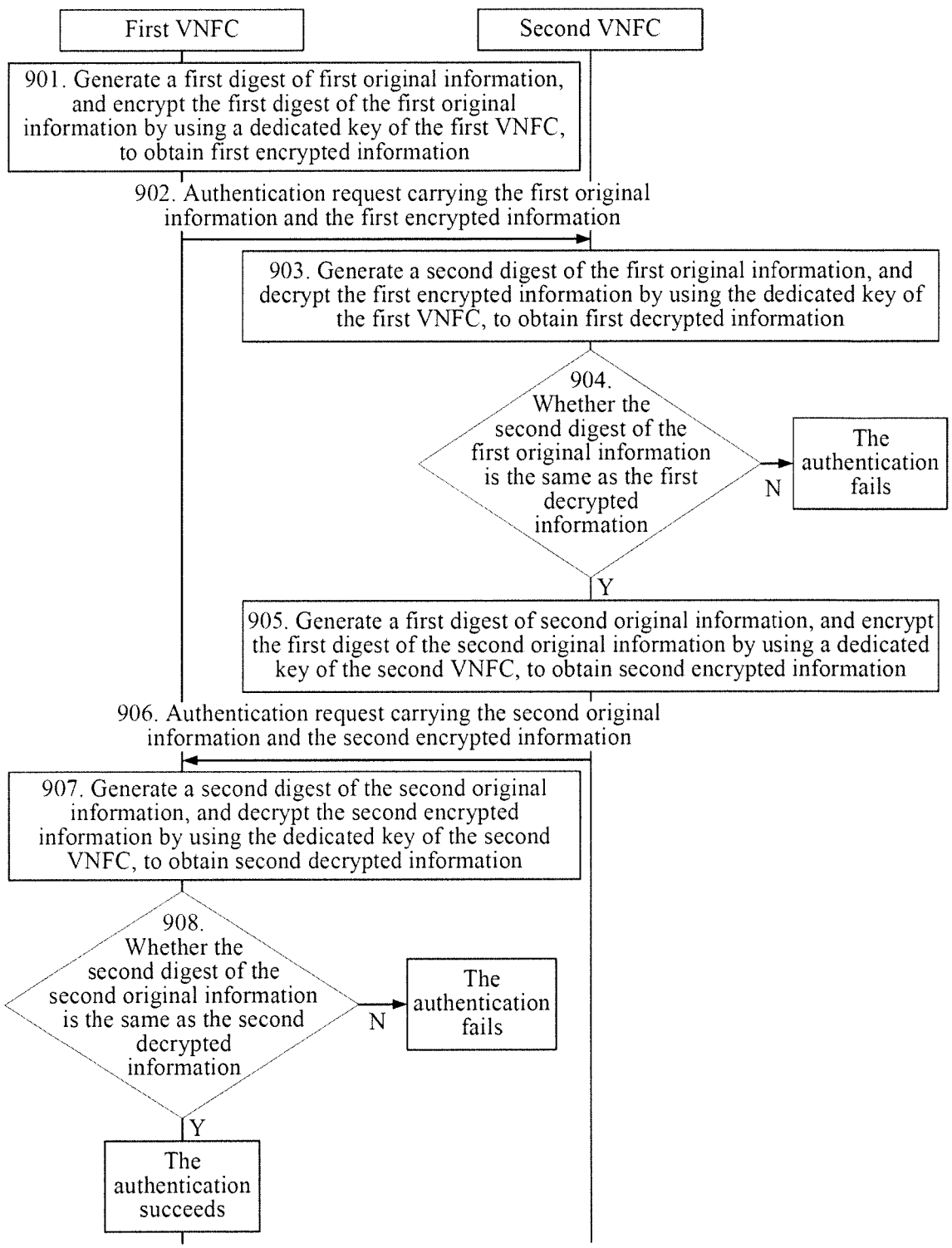
FIG. 9 is a second schematic diagram of an identity authentication process according to an embodiment of the present invention.

For example, in a specific embodiment, when the dedicated key of the first VNFC and the dedicated key of the second VNFC are written or sent to the first VNFC, identification information of the first VNFC may further be sent to the first VNFC; when the dedicated key of the first VNFC and the dedicated key of the second VNFC are written or sent to the second VNFC, identification information of the second VNFC may further be written or sent to the second VNFC. In this case, the identity authentication process shown in FIG. 9 may be used between the first VNFC and the second VNFC. The process specifically includes the following steps.

Step 901. The first VNFC generates a first digest of first original information, and encrypts the first digest of the first original information by using the dedicated key of the first VNFC, to obtain first encrypted information. The first original information includes the identification information of the first VNFC, and may further include a communication connection request of the first VNFC to the second VNFC.

Step 902. The first VNFC sends an authentication request carrying the first original information and the first encrypted information to the second VNFC.

Step 903. The second VNFC receives the authentication request carrying the first original information and the first encrypted information and sent by the first VNFC; then, the second VNFC generates a second digest of the first original information, and decrypts the first encrypted information by using the dedicated key of the first VNFC, to obtain first decrypted information.

Step 904. Determine whether the second digest of the first original information is the same as the first decrypted information.

When the second digest of the first original information is different from the first decrypted information, identity authentication of the first VNFC by the second VNFC fails, the authentication process ends, and a communication connection is not established between the two VNFCs.

When the second digest of the first original information is the same as the first decrypted information, the identity authentication of the first VNFC by the second VNFC succeeds, and perform step 905.

Step 905. The second VNFC generates a first digest of second original information, and encrypts the first digest of the second original information by using the dedicated key of the second VNFC, to obtain second encrypted information. The second original information includes the identification information of the second VNFC, and may further include a communication connection request of the second VNFC to the first VNFC.

Step 906. The second VNFC sends an authentication request carrying the second original information and the second encrypted information to the first VNFC.

Step 907. The first VNFC receives the authentication request carrying the second original information and the second encrypted information and sent by the second VNFC; then, the first VNFC generates a second digest of the second original information, and decrypts the second encrypted information by using the dedicated key of the second VNFC, to obtain second decrypted information.

Step 908. Determine whether the second digest of the second original information is the same as the second decrypted information.

When the second digest of the second original information is different from the second decrypted information, identity authentication of the second VNFC by the first VNFC fails, and a communication connection is not established between the two VNFCs.

When the second digest of the second original information is same as the second decrypted information, the identity authentication of the first VNFC by the second VNFC succeeds. In this case, the identity authentication between the first VNFC and the second VNFC succeeds, and a secure communication connection can be established between the two VNFCs.

Preferably, when the dedicated key of the first VNFC and the dedicated key of the second VNFC are written or sent to the first VNFC, the identification information of the second VNFC may further be written or sent to the first VNFC. A correspondence between the identification information of the second VNFC and the dedicated key of the second VNFC is stored in the first VNFC, so that subsequently when an authentication request sent by the second VNFC, the dedicated key of the second VNFC can be obtained quickly according to the identification information of the second VNFC in the second original information.

Correspondingly, when the dedicated key of the first VNFC and the dedicated key of the second VNFC are written or sent to the second VNFC, the identification information of the first VNFC may further be written or sent to the second VNFC. A correspondence between the identification information of the first VNFC and the dedicated key of the first VNFC is stored in the second VNFC, so that subsequently when an authentication request sent by the first VNFC is received, the dedicated key of the first VNFC can be obtained quickly according to the identification information of the first VNFC in the first original information.

It can be seen that, by means of the foregoing identity authentication method provided by this embodiment of the present invention, when configuration information required for establishing a VNF is generated, a dedicated key may be generated for each of VNFCs that constitute the VNF; the dedicated key of the VNFC is placed into the VNFC and a VNFC that needs to communicate with the VNFC. Certainly, a quantity of VNFCs that need to communicate with the VNFC may be one or more. Identity authentication between the VNFCs can be implemented by verifying matching of the dedicated keys between the VNFCs.

For a specific implementation of the identity authentication method shown in FIG. 8 in an NFV system, refer to the foregoing Embodiments 1 to 4, and details are not described herein again.

Based on the above, by means of the method provided by this embodiment of the present invention, automatic placement of identity credentials can be implemented, and it is unnecessary to place the identity credentials by means of manual configuration, so that relatively high efficiency is achieved. In addition, a communication relationship between VNFCs in a VNF changes dynamically. By means of the method provided by this embodiment of the present invention, identity authentication between the VNFCs can be implemented automatically regardless of how the communication relationship between the VNFCs changes. Therefore, the method can adapt to a dynamically changing VNF. In addition, because an existing NFV system may be used, the method is easy to implement.

Figure 10:
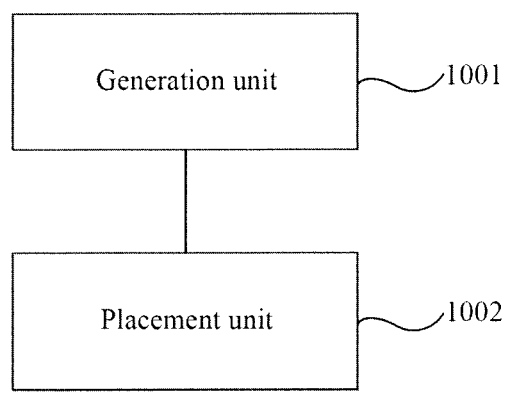
FIG. 10 is a first schematic diagram of an identity authentication apparatus according to an embodiment of the present invention.

Based on the same invention concept, according to the identity authentication method provided by the foregoing embodiments of the present invention, correspondingly, another embodiment of the present invention further provides an identity authentication apparatus, applied to an NFV system. The NFV system includes a VNF, and the VNF includes a first VNFC and a second VNFC. For example, in an embodiment, the first VNFC is an OMU-VNFC, and the second VNFC is a SER-VNFC. In another embodiment, the first VNFC is a SER-VNFC, and the second VNFC is an OMU-VNFC. In still another embodiment, the first VNFC is a SER-VNFC, and the second VNFC is a SER-VNFC. The identity authentication apparatus provided by this embodiment of the present invention may be implemented by using a VNFM, an EMS, or an NFVO in an existing NFV system. FIG. 10 is a schematic structural diagram of the identity authentication apparatus. The apparatus specifically includes:

a generation unit 1001, configured to generate a public key and a private key of the first VNFC and a public key and a private key of the second VNFC; and a placement unit 1002, configured to write or send the private key of the first VNFC and the public key of the second VNFC to the first VNFC, and write or send the public key of the first VNFC and the private key of the second VNFC to the second VNFC, where the public key and the private key of the first VNFC and the public key and the private key of the second VNFC are used for identity authentication of the first VNFC and the second VNFC.

Further, the placement unit 1002 is specifically configured to: write the private key of the first VNFC and the public key of the second VNFC to the first VNFC when the first VNFC is generated; or send the private key of the first VNFC and the public key of the second VNFC to the first VNFC by using a management communication channel of the first VNFC when the first VNFC is a management VNFC.

Further, the placement unit 1002 is specifically configured to: write the public key of the first VNFC and the private key of the second VNFC to the second VNFC when the second VNFC is generated; or send the public key of the first VNFC and the private key of the second VNFC to the second VNFC by using a management communication channel of the second VNFC when the second VNFC is a management VNFC.

Preferably, the placement unit 1002 is further configured to write or send identification information of the second VNFC to the first VNFC, where a correspondence between the identification information of the second VNFC and the public key of the second VNFC is stored in the first VNFC.

Further, the placement unit 1002 is further configured to write or send identification information of the first VNFC to the first VNFC.

Specifically, the generation unit 1001 may be implemented by using a processor, and the placement unit 1002 may be implemented by using an input/output interface. The input/output interface may include a writer or a sender.

Figure 11:
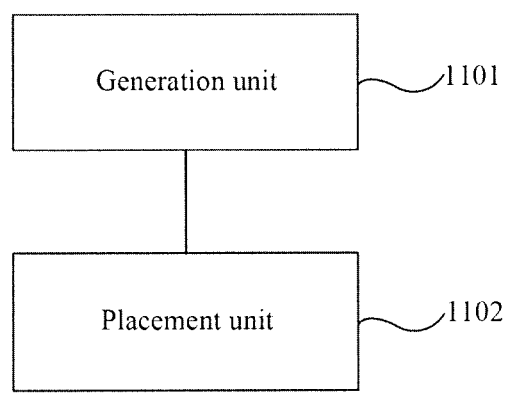
FIG. 11 is a second schematic diagram of an identity authentication apparatus according to an embodiment of the present invention.

Based on the same invention concept, according to the identity authentication method provided by the foregoing embodiments of the present invention, correspondingly, another embodiment of the present invention further provides an identity authentication apparatus, applied to an NFV system. The NFV system includes a VNF, and the VNF includes a first VNFC and a second VNFC. FIG. 11 is a schematic structural diagram of the identity authentication apparatus. The apparatus specifically includes:

a generation unit 1101, configured to generate a dedicated key of the first VNFC and a dedicated key of the second VNFC; and a placement unit 1102, configured to write or send the dedicated key of the first VNFC and the dedicated key of the second VNFC to the first VNFC, and write or send the dedicated key of the first VNFC and the dedicated key of the second VNFC to the second VNFC, where the dedicated key of the first VNFC and the dedicated key of the second VNFC are used for identity authentication of the first VNFC and the second VNFC.

Further, the placement unit 1102 is specifically configured to: write the dedicated key of the first VNFC and the dedicated key of the second VNFC to the first VNFC when the first VNFC is generated; or send the dedicated key of the first VNFC and the dedicated key of the second VNFC to the first VNFC by using a management communication channel of the first VNFC when the first VNFC is a management VNFC.

Further, the placement unit 1102 is specifically configured to: write the dedicated key of the first VNFC and the dedicated key of the second VNFC to the second VNFC when the second VNFC is generated; or send the dedicated key of the first VNFC and the dedicated key of the second VNFC to the second VNFC by using a management communication channel of the second VNFC when the second VNFC is a management VNFC.

Preferably, the placement unit 1102 is further configured to write or send identification information of the second VNFC to the first VNFC, where a correspondence between the identification information of the second. VNFC and a dedicated key of the second VNFC is stored in the first VNFC.

Further, the placement unit 1102 is further configured to write or send identification information of the first VNFC to the first VNFC.

Specifically, the generation unit 1101 may be implemented by using a processor, and the placement unit 1102 may be implemented by using an input/output interface. The input/output interface may include a writer or a sender.

Based on the above, compared with the prior art, the solutions provided by the embodiments of the present invention can automatically implement identity authentication between VNFCs, has high efficiency and can adapt to a dynamically changing VNF.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby configured to generate computer-implemented processing. Therefore, the instructions executed on the computer or the another programmable device provide steps for implementing a specified function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An identity authentication method, applied to a network function virtualization (NFV) system, wherein the NFV system comprises a virtual network function (VNF), and the VNF comprises a first virtual network function component (VNFC) and a second VNFC, the method comprising:
    generating a public key and a private key of the first VNFC and a public key and a private key of the second VNFC;
    writing or sending the private key of the first VNFC and the public key of the second VNFC to the first VNFC;
    writing or sending the public key of the first VNFC and the private key of the second VNFC to the second VNFC;
    sending, by the first VNFC and to the second VNFC, a first authentication request comprising a first information and a first digest of the first information that is encrypted using the private key of the first VNFC; and
    authenticating, by the second VNFC, an identity of the first VNFC based on the first authentication request and the public key of the first VNFC.

2. The method according to claim 1, wherein the writing the private key of the first VNFC and the public key of the second VNFC to the first VNFC comprises:
    writing the private key of the first VNFC and the public key of the second VNFC to the first VNFC when the first VNFC is generated.

3. The method according to claim 1, wherein the sending the private key of the first VNFC and the public key of the second VNFC to the first VNFC comprises:
    sending the private key of the first VNFC and the public key of the second VNFC to the first VNFC by using a management communication channel of the first VNFC when the first VNFC is a management VNFC.

4. The method according to claim 1, further comprising:
    writing or sending identification information of the second VNFC to the first VNFC, wherein a correspondence between the identification information of the second VNFC and the public key of the second VNFC is stored in the first VNFC.

5. The method according to claim 1, further comprising:
    writing or sending identification information of the first VNFC to the first VNFC.

6. An identity authentication method, applied to a network function virtualization (NFV) system, wherein the NFV system comprises a virtual network function (VNF), and the VNF comprises a first virtual network function component (VNFC) and a second VNFC, the method comprising:
    generating a dedicated key of the first VNFC and a dedicated key of the second VNFC;
    writing or sending the dedicated key of the first VNFC and the dedicated key of the second VNFC to the first VNFC;
    writing or sending the dedicated key of the first VNFC and the dedicated key of the second VNFC to the second VNFC;
    sending, by the first VNFC and to the second VNFC, a first authentication request comprising a first information and a first digest of the first information that is encrypted using the dedicated key of the first VNFC; and
    authenticating, by the second VNFC, an identity of the first VNFC based on the first authentication request and the dedicated key of the first VNFC.

7. The method according to claim 6, wherein the writing the dedicated key of the first VNFC and the dedicated key of the second VNFC to the first VNFC comprises:
    writing the dedicated key of the first VNFC and the dedicated key of the second VNFC to the first VNFC when the first VNFC is generated.

8. The method according to claim 6, wherein the sending the dedicated key of the first VNFC and the dedicated key of the second VNFC to the first VNFC comprises:
    sending the dedicated key of the first VNFC and the dedicated key of the second VNFC to the first VNFC by using a management communication channel of the first VNFC when the first VNFC is a management VNFC.

9. The method according to claim 6, further comprising:
    writing or sending identification information of the second VNFC to the first VNFC, wherein a correspondence between the identification information of the second VNFC and the dedicated key of the second VNFC is stored in the first VNFC.

10. The method according to claim 6, further comprising:
    writing or sending identification information of the first VNFC to the first VNFC.

11. An identity authentication apparatus, applied to a network function virtualization (NFV) system, wherein the NFV system comprises a virtual network function (VNF), and the VNF comprises a first virtual network function component (VNFC) and a second VNFC, the apparatus comprising:
    a processor, configured to generate a public key and a private key of the first VNFC and a public key and a private key of the second VNFC; and
    an input/output interface, configured to:
        write or send the private key of the first VNFC and the public key of the second VNFC to the first VNFC;
        write or send the public key of the first VNFC and the private key of the second VNFC to the second VNFC;
        send, by the first VNFC and to the second VNFC, a first authentication request comprising a first information and a first digest of the first information that is encrypted using the private key of the first VNFC; and
        authenticate, by the second VNFC, an identity of the first VNFC based on the first authentication request and the public key of the first VNFC.

12. The apparatus according to claim 11, wherein the input/output interface is specifically configured to: write the private key of the first VNFC and the public key of the second VNFC to the first VNFC when the first VNFC is generated.

13. The apparatus according to claim 11, wherein the input/output interface is specifically configured to: send the private key of the first VNFC and the public key of the second VNFC to the first VNFC by using a management communication channel of the first VNFC when the first VNFC is a management VNFC.

14. The apparatus according to claim 11, wherein the input/output interface is further configured to write or send identification information of the second VNFC to the first VNFC, wherein a correspondence between the identification information of the second VNFC and the public key of the second VNFC is stored in the first VNFC.

15. The apparatus according to claim 11, wherein the input/output interface is further configured to write or send identification information of the first VNFC to the first VNFC.

16. An identity authentication apparatus, applied to a network function virtualization (NFV) system, wherein the NFV system comprises a virtual network function (VNF), and the VNF comprises a first virtual network function component (VNFC) and a second VNFC, the apparatus comprising:
  a processor, configured to generate a dedicated key of the first VNFC and a dedicated key of the second VNFC; and
  an input/output interface, configured to:
    write or send the dedicated key of the first VNFC and the dedicated key of the second VNFC to the first VNFC;
    write or send the dedicated key of the first VNFC and the dedicated key of the second VNFC to the second VNFC;
    send, by the first VNFC and to the second VNFC, a first authentication request comprising a first information and a first digest of the first information that is encrypted using the dedicated key of the first VNFC; and
    authenticate, by the second VNFC, an identity of the first VNFC based on the first authentication request and the dedicated key of the first VNFC.

17. The apparatus according to claim 16, wherein the input/output interface is specifically configured to: write the dedicated key of the first VNFC and the dedicated key of the second VNFC to the first VNFC when the first VNFC is generated.

18. The apparatus according to claim 16, wherein the input/output interface is specifically configured to: send the dedicated key of the first VNFC and the dedicated key of the second VNFC to the first VNFC by using a management communication channel of the first VNFC when the first VNFC is a management VNFC.

19. The apparatus according to claim 16, wherein the input/output interface is further configured to write or send identification information of the second VNFC to the first VNFC, wherein a correspondence between the identification information of the second VNFC and a dedicated key of the second VNFC is stored in the first VNFC.

20. The apparatus according to claim 16, wherein the input/output interface is further configured to write or send identification information of the first VNFC to the first VNFC.

* * * * *